UNITED STATES PATENT OFFICE.

ANDRÉ MICHELIN, OF PARIS, FRANCE.

PROCESS OF MANUFACTURING ANTISLIPPING TIRES FOR MOTORS AND OTHER VEHICLES.

1,018,626.      Specification of Letters Patent.     Patented Feb. 27, 1912.

No Drawing.     Application filed April 2, 1907. Serial No. 366,060.

*To all whom it may concern:*

Be it known that I, ANDRÉ MICHELIN, a citizen of the Republic of France, and resident of Paris, in the Republic of France, have invented certain new and useful Improvements in Processes of Manufacturing Antislipping Tires for Motors and other Vehicles, of which the following is a specification.

My invention relates to a process of making wheel tires, the object being to produce a tire in which leather and rubber are united without injuring in any way the qualities of the leather and so as to provide a tire which will resist the heat arising during its use on the vehicle.

Hitherto leather has only entered into the manufacture of pneumatic tire casings by means of a cold vulcanization process. In the manufacture of antiskidding tire casings, the layers composed entirely or partially of leather are cemented by means of rubber solutions in a cold process, and, if the leather is secured, either by sewing or by rivets, on to a rubber layer, the cementing of this layer of rubber on to the under layers of rubber is also made by a cold process in order to avoid heating and consequently injuring the leather.

Now, processes of cementing by rubber solutions in a cold process are objectionable because the tire thus manufactured is not able to resist the heat generated by the friction on the road during the time the vehicle is in motion, and, besides, the cementing cannot be complete around the buttons or interior washers of the metallic antiskidding device; these antiskidding pieces having left about them some open spaces which can only be filled by pure rubber.

It has heretofore been proposed to unite leather to rubber by a hot vulcanization, but it has been thought necessary in carrying out this process to remove the grease and oil contained in the leather therefrom. Now, the result of this removal of the oily substances has been to deprive the leather of its flexibility and its quality of resisting atmospheric agents, with the result that this process could not be adapted for the manufacture of casings for pneumatic tires having a protecting strip of leather. I have discovered by experimentation that the condition of being anhydrous is necessary and is of itself sufficient to permit leather to undergo without deterioration the temperature necessary for a hot vulcanization; and that consequently it is only necessary to remove from the leather the water which it contains, while leaving in it all the greasy matters called "stuffing" in order to carry out thereafter a hot dry vulcanization process for uniting the leather to the rubber.

The following experiment is conclusive. If one takes a sample of ordinary leather of commerce and renders it anhydrous by drying it in a hot air stove at a temperature below 100° C. and then immediately on removing it from the stove it is plunged into anhydrous oil or grease at a temperature of about 140° C.; the leather withdrawn from this oily bath after an hour has not become deteriorated in any way. On the contrary, if a sample of this same leather is exposed to the air for several hours after its removal from the hot air stove, and after having thus regained from the atmosphere its normal percentage of water, is plunged into the same bath of oil or grease for some minutes, it will be found when it is withdrawn from this bath, that it has been transformed partially into gelatin. Consequently the water is the single and only cause of deterioration in leather when it is submitted to a temperature of from 130 to 140° C.

My invention consists in a process of manufacturing an antiskidding tire casing including a layer composed of friction fabric covered with a band of leather and a rubber cushion interposed between the fabric and the leather; the whole being united by a hot vulcanization process. This entire layer, leather, fabric, and rubber, is traversed by metallic rivets, the heads of which rest upon the outer surface of the leather and the washers of which are riveted on the rubber on the opposite surface. On this last mentioned surface is placed a thick layer of rubber by means of a hot vulcanization process, which layer is adapted to completely cover the washers of the rivets and also to bind the part of the tire containing the leather to the carcass during the hot vulcanizing process.

In order that the vulcanization may be carried out without injuring the leather, it is necessary that the latter shall be previously rendered anhydrous, that is to say, placed in a stove at a temperature below 110

100° C. for the purpose of evaporating from the leather the hygrometric water which it contains. This removal of the water may be carried out before or after the leather is riveted to the friction fabric. The indispensable condition and the only necessary condition is that the leather shall be anhydrous at the moment of beginning the hot vulcanization and that it shall be maintained anhydrous throughout the vulcanization. In order to fulfil this last mentioned condition, there may be employed several known means of vulcanization by dry heat, such, for instance, as heating by direct contact with metallic molds which are themselves heated by hollow plates provided with an internal circulation of steam; heating by contact with electric resistances; heating by conductibility with some material divided up into small parts, such as lead shot; heating by hot gas; or by hot anhydrous liquid.

The vulcanization of the pneumatic tire casing may be carried out at one step by one of the processes above mentioned after the incorporation of the leather, or, indeed, certain parts, as for example the carcass proper, or the outer layer not provided with the leather, may be submitted to a previous vulcanization, partial or complete, by means of steam.

What I claim is:

1. The process of incorporating leather as an element in tires which consists in rendering the leather anhydrous while permitting the oils and greases to remain therein, second, applying a layer of crude rubber or of hot vulcanizing solution thereto, third, associating the leather with the other elements of the tire, and finally, subjecting the whole to dry vulcanizing heat.

2. The process of incorporating leather as an element in tires which consists in, rendering the leather anhydrous, applying a layer of rubber between the leather and the tread of the tire, applying a layer of rubber between the tread and the body of the tire, and finally subjecting the tire to a dry vulcanizing heat.

In testimony, that I claim the foregoing as my invention, I have signed my name in presence of two witnesses, this 22d day of March 1907.

ANDRÉ MICHELIN.

Witnesses:
  H. C. COXE,
  ALCIDE FABE.